United States Patent
Nemechek, III

(10) Patent No.: US 8,978,707 B1
(45) Date of Patent: Mar. 17, 2015

(54) PIPE TESTING FIXTURE

(71) Applicant: Andrew Nemechek, III, Cooper City, FL (US)

(72) Inventor: Andrew Nemechek, III, Cooper City, FL (US)

( * ) Notice: Subject to any disclaimer, the term of this patent is extended or adjusted under 35 U.S.C. 154(b) by 0 days.

(21) Appl. No.: 14/081,126

(22) Filed: Nov. 15, 2013

(51) Int. Cl.
*F16L 55/10* (2006.01)
*F16L 55/105* (2006.01)

(52) U.S. Cl.
CPC .................................. *F16L 55/105* (2013.01)
USPC ................ 138/94; 138/97; 251/326; 251/214

(58) Field of Classification Search
CPC .... F16K 27/044; F16K 27/047; F16L 55/105; F16L 41/06
USPC ........... 138/94, 97; 137/318, 321, 322, 15.14; 251/326–330, 214
See application file for complete search history.

(56) References Cited

U.S. PATENT DOCUMENTS

| | | | |
|---|---|---|---|
| 1,743,338 A * | 1/1930 | Field .......................... | 137/315.41 |
| 3,517,554 A | 6/1970 | Smith | |
| 3,749,108 A * | 7/1973 | Long .......................... | 137/15.17 |
| 3,844,531 A * | 10/1974 | Grengs ......................... | 251/327 |
| 4,932,241 A | 6/1990 | Carmody et al. | |
| 4,944,484 A * | 7/1990 | Hostetler ....................... | 251/101 |
| 5,370,149 A * | 12/1994 | Clarkson et al. .............. | 137/375 |
| 5,388,288 A | 2/1995 | Fell, Sr. | |
| 5,464,035 A * | 11/1995 | Heinecke ....................... | 137/312 |
| 6,422,535 B1 * | 7/2002 | Stone et al. ................... | 251/327 |
| 6,655,413 B2 * | 12/2003 | Condon et al. ............... | 138/94.3 |
| 6,776,184 B1 * | 8/2004 | Maichel et al. ............... | 137/318 |
| 7,225,827 B2 * | 6/2007 | Maichel et al. ............... | 137/318 |
| 2001/0013585 A1 * | 8/2001 | Robert ......................... | 251/214 |

* cited by examiner

*Primary Examiner* — Patrick F Brinson
(74) *Attorney, Agent, or Firm* — Crossley Patent Law

(57) ABSTRACT

A pipe testing fixture including a housing with a chamber, an aperture centrally disposed on the housing. A groove centrally disposed within the lower chamber. A pipe fluidly engages the chamber through the housing. A pipe closure body with a handle slidingly engages the aperture and chamber with a plate disposed on the handle. The plate slidingly engages the chamber, the lower end sealingly engaging the groove, configured to seal the lower chamber of the pipe. A plate face gasket continuously disposed on the front and rear sides of the plate. A locking pin is engagable through a pin hole upon positioning the pin hole outside the upper chamber. The engagement and alternate disengagement of the locking pin through the pin hole places the plate in an open locked position and an alternate closed position within the chamber. A separate carrier pipe segment engages the pipe portions.

3 Claims, 5 Drawing Sheets

PIPE TESTING FIXTURE

BACKGROUND OF THE INVENTION

Various types of pipe testing fixtures are known in the prior art. However, what is needed is a pipe testing fixture that will eliminate water damage, such as to flooring or dry wall, and prevent mold by allowing the user to ensure that all leaks have been sealed prior to the completion of pipe repairs. A carrier pipe is a hollow cylindrical tube responsible for carrying fluids. The carrier pipe runs through an outer, insulated casing that acts as a containment system that protects against leaks and spills. The present pipe testing fixture is attachable to an existing carrier pipe to allow the user to determine whether a leak has been repaired properly and the carrier pipe is properly sealed without the risk of further damage. The present pipe testing fixture can be made of plastics such as polyvinyl chloride (PVC), acrylonitrile butadiene styrene (ABS) or fiberglass, or strong metals, such as steel or cast iron, and other materials that promote the functions of the present device. The present device is devised to eliminate insurance claims, thus saving time and money.

FIELD OF THE INVENTION

The present invention relates to pipe fixtures, and more particularly, to a pipe testing fixture.

SUMMARY OF THE INVENTION

The general purpose of the present Pipe Pressure Testing Fixture, described subsequently in greater detail, is to provide a pipe testing fixture which has many novel features that result in a pipe testing fixture which is not anticipated, rendered obvious, suggested, or even implied by prior art, either alone or in combination thereof.

To accomplish this, the present pipe testing fixture includes a hollow parallelepiped housing having a front wall, a back wall, a right wall, a left wall, a bottom wall, a top wall, an inner wall, and an outer wall. An upper chamber is disposed within the housing proximal the top wall. An aperture is centrally disposed in the upper chamber within the top wall. An O-ring gasket centrally disposed within the top wall proximal the aperture in a position vertically aligned with the aperture. A lower chamber is disposed between the upper chamber and the bottom wall. A groove is centrally disposed within the lower chamber proximal the bottom wall. A cylindrical pipe fluidly engages the lower chamber, the pipe has a front portion engaging the front wall and a rear portion engaging the back wall. A pipe closure body has a cylindrical handle which slidingly engages the aperture and the upper chamber. The handle has a distal end and a proximal end. A knob is disposed on the handle distal end. A plate is disposed on the handle proximal end. The plate has an upper end, a lower end, a front side, and a rear side. The plate slidingly engages the lower chamber with the lower end sealingly engaging the groove. The plate is configured to seal the lower chamber between the front portion and the rear portion of the pipe. A plate face gasket is continuously disposed on each of the front and rear sides of the plate. A pin hole is disposed on the handle proximal the upper end of the plate. A locking pin is engagable through the pin hole upon the positioning of the pin hole outside of the upper chamber. The engagement and alternate disengagement of the locking pin through the pin hole places the plate in an open locked position within the upper chamber and an alternate closed position within the lower chamber. A separate carrier pipe segment engages each of the pipe front portion and the pipe rear portion.

Thus has been broadly outlined the more important features of the present pipe testing fixture so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
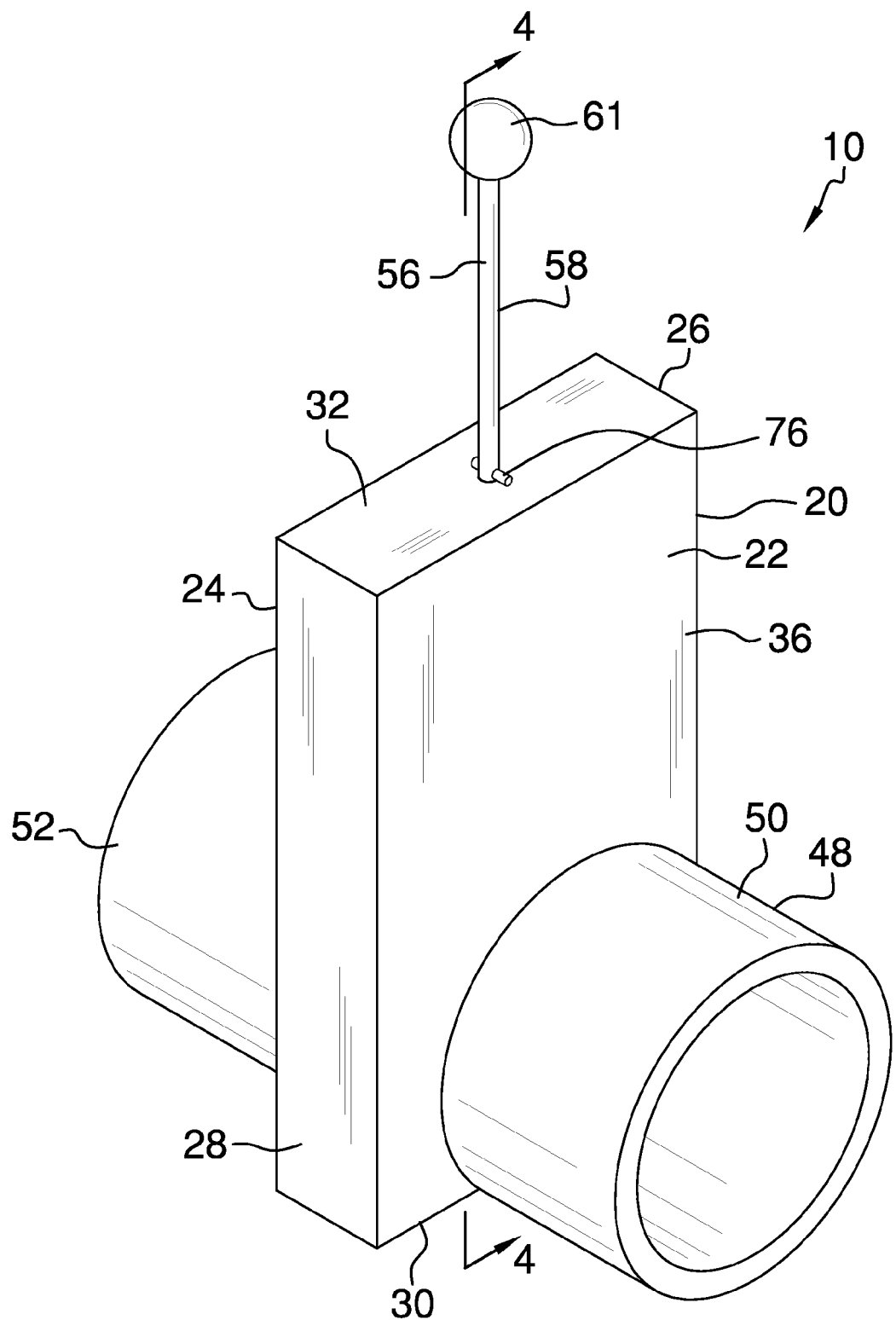
FIG. 1 is an isometric view.
Figure 2:
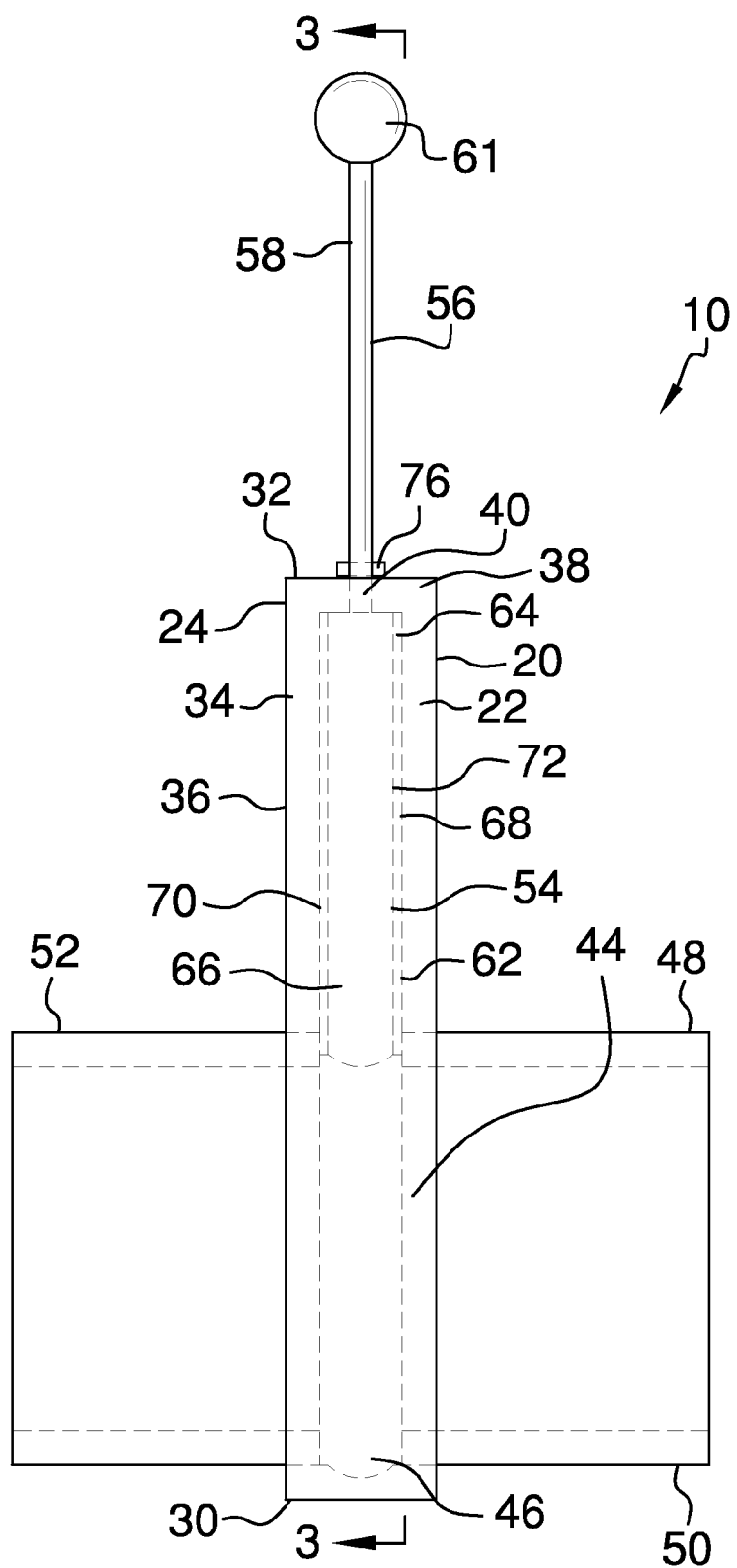
FIG. 2 is a side elevation view.
Figure 3:
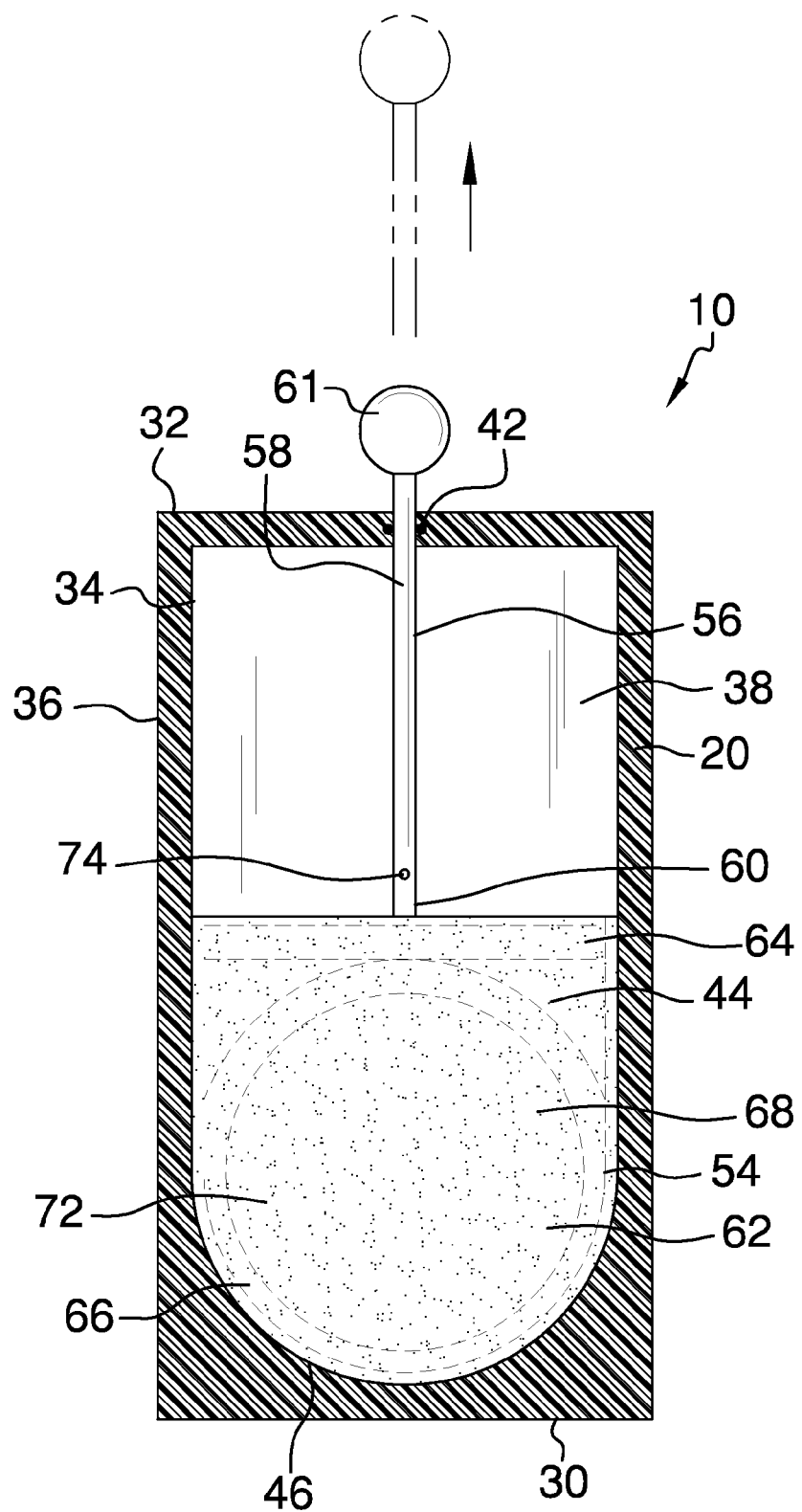
FIG. 3 is a cross-sectional view taken along line 3-3 of FIG. 2.
Figure 4:
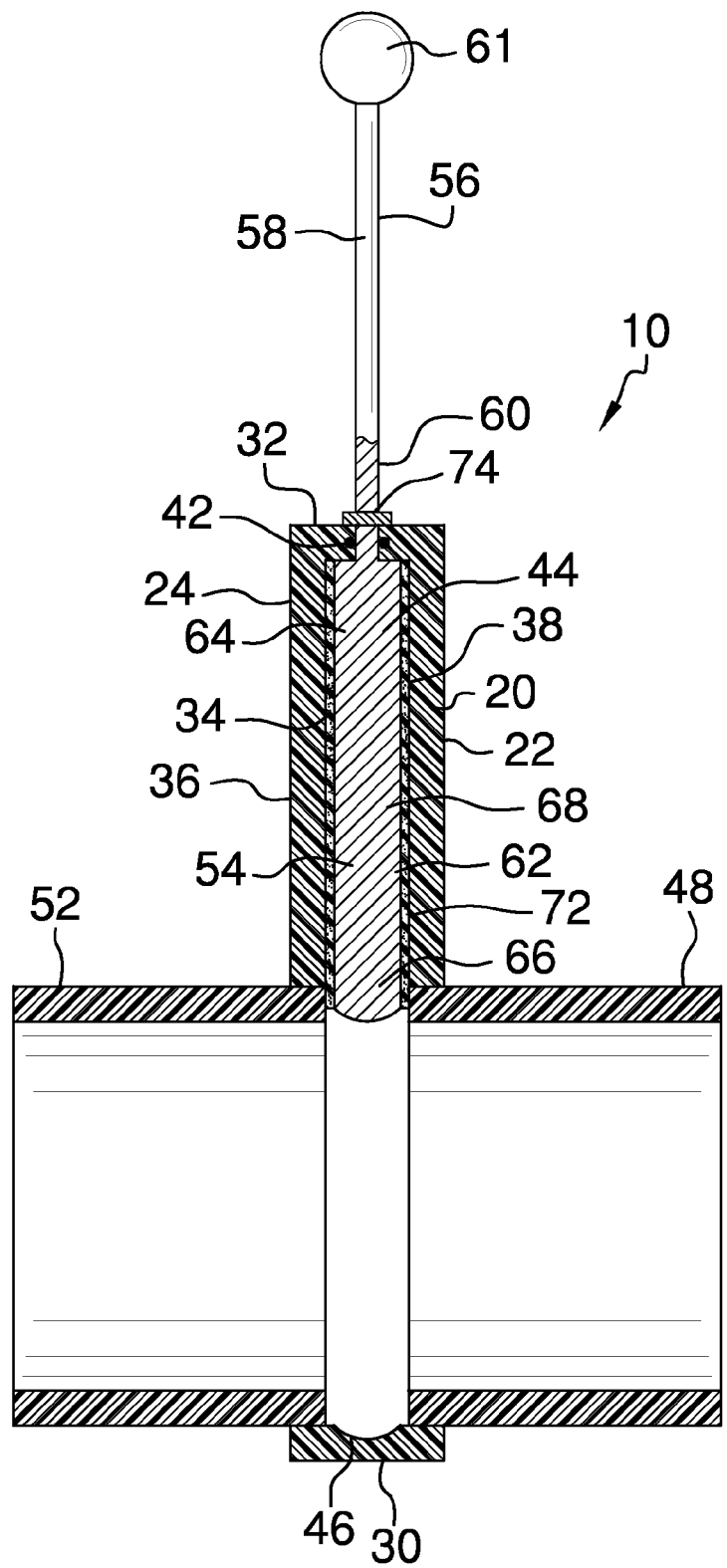
FIG. 4 is a cross-sectional view taken along line 4-4 of FIG. 3.
Figure 5:
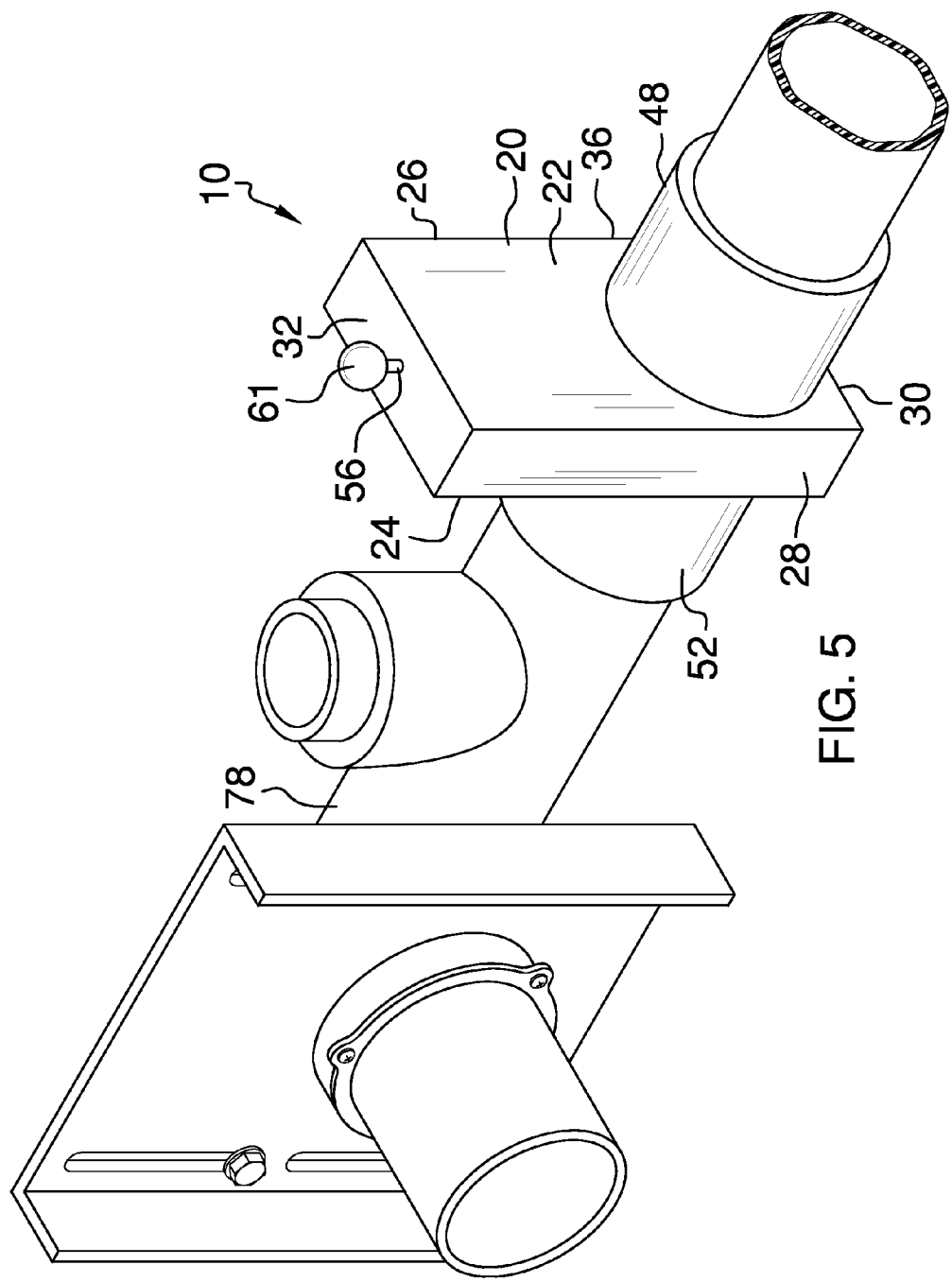
FIG. 5 is an in use view.

With reference now to the drawings, and in particular FIGS. 1 through 5 thereof, an example of the instant pipe testing fixture employing the principles and concepts of the present pipe testing fixture and generally designated by the reference number 10 will be described.

Referring to FIGS. 1 through 5 the present pipe testing fixture 10 is illustrated. The pipe testing fixture 10 includes a hollow parallelepiped housing 20 having a front wall 22, a back wall 24, a right wall 26, a left wall 28, a bottom wall 30, a top wall 32, an inner wall 34, and an outer wall 36. An upper chamber 38 is disposed within the housing 20 proximal the top wall 32. An aperture 40 is centrally disposed in the upper chamber 38 within the top wall 32. An O-ring gasket 42 centrally disposed within the top wall 32 proximal the aperture 40 in a position vertically aligned with the aperture 40. A lower chamber 44 is disposed between the upper chamber 38 and the bottom wall 30. A groove 46 is centrally disposed within the lower chamber 44 proximal the bottom wall 30. A cylindrical pipe 48 fluidly engages the lower chamber 44, the pipe 48 has a front portion 50 engaging the front wall 22 and a rear portion 52 engaging the back wall 24. A pipe closure body 54 has a cylindrical handle 56 which slidingly engages the aperture 40 and the upper chamber 38. The handle 56 has a distal 58 end and a proximal end 60. A knob 61 is disposed on the handle distal end 58. A plate 62 is disposed on the handle proximal end 60. The plate 62 has an upper end 64, a lower end 66, a front side 68, and a rear side 70. The plate 62 slidingly engages the lower chamber 44 with the lower end 66 sealingly engaging the groove 46. The plate 62 is configured to seal the lower chamber 44 between the front portion 50 and the rear portion 52 of the pipe 48. A plate face gasket 72 is continuously disposed on each of the front and rear sides 68, 70 of the plate 62. A pin hole 74 is disposed on the handle 56 proximal the upper end 64 of the plate 62. A locking pin 76 is engagable through the pin hole 72 upon the positioning of the pin hole 74 outside of the upper chamber 38. The engagement and alternate disengagement of the locking pin 76 through the pin hole 74 places the plate 62 in an open locked position within the upper chamber 38 and an alternate closed position within the lower chamber 44. A separate carrier pipe segment 78 inserts into each of the pipe front portion 50 and the pipe rear portion 52.

What is claimed is:

1. A pipe testing fixture comprising:
a hollow parallelepiped housing having a front wall, a back wall, a right wall, a left wall, a bottom wall, a top wall, an inner wall, and an outer wall;
an upper chamber disposed within the housing proximal the top wall;
an aperture centrally disposed in the upper chamber within the top wall;
an O-ring gasket centrally disposed within top wall proximal the aperture in a position vertically aligned with the aperture;
a lower chamber disposed between the upper chamber and the bottom;
a groove centrally disposed within the lower chamber proximal the bottom wall;
a cylindrical pipe fluidly engaging the lower chamber, the pipe having a front portion engaging the front wall and rear portion engaging the back wall;
a pipe closure body comprising:
   a cylindrical handle slidingly engaging the aperture and the upper chamber, the handle having a distal end and a proximal end;
   a plate disposed on the handle proximal end, the plate having an upper end, a lower end, a front side, and a rear side, the plate slidingly engaging the lower chamber, the lower end sealingly engaging the groove, wherein the plate is configured to seal the lower chamber between the front portion and the rear portion of the pipe;
   a plate face gasket continuously disposed on each of the front and rear sides of the plate;
   a pin hole disposed on the handle proximal the upper end of the plate;
   a locking pin, wherein the locking pin is engagable through the pin hole upon the positioning of the pin hole outside of the upper chamber;
   wherein the engagement and alternate disengagement of the locking pin through the pin hole places the plate in an open locked position on within the upper chamber and an alternate closed position within the lower chamber;
wherein a separate carrier pipe segment engages each of the pipe front portion and the pipe rear portion.

2. The pipe testing fixture of claim 1 further comprising:
a knob disposed on the handle distal end.

3. A pipe testing fixture comprising:
a hollow parallelepiped housing having a front wall, a back wall, a right wall, a left wall, a bottom wall, a top wall, an inner wall, and an outer wall;
an upper chamber disposed within the housing proximal the top wall;
an aperture centrally disposed in the upper chamber within the top wall;
an O-ring gasket centrally disposed within top wall proximal the aperture in a position vertically aligned with the aperture;
a lower chamber disposed between the upper chamber and the bottom;
a groove centrally disposed within the lower chamber proximal the bottom wall;
a cylindrical pipe fluidly engaging the lower chamber, the pipe having a front portion engaging the front wall and rear portion engaging the back wall;
a pipe closure body comprising:
   a cylindrical handle slidingly engaging the aperture and the upper chamber, the handle having a distal end and a proximal end; a knob disposed on the handle distal end
   a plate disposed on the handle proximal end, the plate having an upper end, a lower end, a front side, and a rear side, the plate slidingly engaging the lower chamber, the lower end sealingly engaging the groove, wherein the plate is configured to seal the lower chamber between the front portion and the rear portion of the pipe;
   a plate face gasket continuously disposed on each of the front and rear sides of the plate;
   a pin hole disposed on the handle proximal the upper end of the plate;
   a locking pin, wherein the locking pin is engagable through the pin hole upon the positioning of the pin hole outside of the upper chamber;
   wherein the engagement and alternate disengagement of the locking pin through the pin hole places the plate in an open locked position on within the upper chamber and an alternate closed position within the lower chamber;
wherein a separate carrier pipe segment engages each of the pipe front portion and the pipe rear portion.

\* \* \* \* \*